United States Patent [19]

Ijiri et al.

[11] Patent Number: 4,637,484

[45] Date of Patent: Jan. 20, 1987

[54] HYDRAULIC CONTROL APPARATUS FOR A POWER STEERING DEVICE

[75] Inventors: Waichiro Ijiri, Osaka; Shuzo Hirakushi, Nara, both of Japan

[73] Assignee: Koyo Jidoki Kabushiki Kaisha, Nara, Japan

[21] Appl. No.: 725,422

[22] Filed: Apr. 22, 1985

[30] Foreign Application Priority Data

Apr. 20, 1984 [JP] Japan .................. 59-79867

[51] Int. Cl.⁴ .............................................. B62D 5/08
[52] U.S. Cl. .................................... 180/142; 91/434; 91/458; 180/148
[58] Field of Search ............... 180/143, 142, 141, 148; 91/434, 458

[56] References Cited

U.S. PATENT DOCUMENTS

| | | | |
|---|---|---|---|
| 3,744,515 | 7/1973 | Inoue | 180/143 |
| 4,434,866 | 3/1984 | Duffy | 180/143 |
| 4,531,602 | 7/1985 | Roehringer | 180/143 |

*Primary Examiner*—John A. Pekar
*Attorney, Agent, or Firm*—Robert E. Burns; Emmanuel J. Lobato; Bruce L. Adams

[57] ABSTRACT

In a handle steering force control mechanism adapted to stabilize steering feeling of a steering handle by imparting hydraulic reaction to a power steering device when the vehicle is travelling at high speed, a hydraulic control apparatus for supplying stabilized pressure oil to the power steering device and a hydraulic reaction chamber. This hydraulic control apparatus comprises a main spool and a sub-spool slidably inserted into the main spool to form a variable throttle whose open area is varied by relative displacement therebetween. This variable throttle, when the vehicle travels at high speed, closes the main valve side by the sub-spool and opens the hydraulic reaction side to increase reaction pressure. When reaction pressure reaches a predetermined value in response to steering pressure, the main spool is displaced by pressure oil to cut the reaction pressure.

12 Claims, 8 Drawing Figures

HYDRAULIC CONTROL APPARATUS FOR A POWER STEERING DEVICE

FIELD AND BACKGROUND OF THE INVENTION

The present invention relates to a power steering apparatus for controlling a steering force of a vehicle by fluid, and more specifically, to a hydraulic control apparatus for feeding pressurized oil to a power steering device and a hydraulic reaction device in a handle or wheel steering force control apparatus in which when the vehicle runs at a high speed, a hydraulic reaction is imparted to the power steering device to stabilize a steering feeling of the handle or the wheel.

The power steering device is widely known in which a power mechanism is provided in the midst of a steering device of the vehicle to lighten the handle steering force. On the other hand, in the steering operation of the vehicle, it is desirable to obtain a greater power at the time of low speed driving than that at the time of high speed driving. In response to this demand, U.S. Pat. Nos. 4,034,825, 3,744,515 and the like have been proposed to control generated torque of the power steering device in response to the speed of vehicle.

A supply of oil in the handle or wheel steering force control apparatus as described is achieved in a system as shown in FIG. 1. An oil passage from an oil pump 11 is branched into two parts, one being communicated with a main valve 12 for controlling a power cylinder 13, and the other being communicated with a hydraulic control valve device 14. Oil pressure from the hydraulic control valve device 14 is controlled by a controller 16 for receiving a signal from a vehicle speed sensor 15 which detects a speed of the vehicle to provide a signal corresponding to the speed so as to control the hydraulic control valve device 14, and oil pressure is fed to the hydraulic reaction chamber 17. Thereby, the hydraulic reaction is imparted to the input shaft at the time of high speed driving to increase a rigidity in the vicinity of a neutral position of the steering handle or wheel for safety travelling. Reaction pressure Pf applied to the hydraulic reaction chamber 17 is determined by an open area of the valve 12 and an open area of a fixed throttle valve provided on the hydraulic control valve device 14. However, there was a drawback such that since a portion in the vicinity of neutral of the steering handle or wheel is greatest in the open area, the reaction pressure Pf does not elevate and the ridigity of the steering handle or wheel when the vehicle travels straight forward at high speed is not increased. Furthermore, the oil always flows, during travelling, toward the return through the fixed throttle valve of the hydraulic control valve device, and therefore, a large quantity of oil was necessary. Because of this, an oil pump becomes large to not only increase cost but also to bring shortage of supply of oil and as a consequence, delay of response of handling occurs and feeling is deteriorated. In case of a spool system in which the hydraulic control valve device comprises a sub-spool whose position is controlled by a plunger of a solenoid controlled by the vehicle speed sensor 15 and a main spool which is axially slidably fitted in the sub-spool and which is moved by oil pressure, there was a drawback, such that since the main and sub-spools have their axial ends urged and supported by springs, the relative position between the main and sub-spools is displaced due to unevenness of a spring characteristic of said springs to fail to obtain the stabilized hydraulic characteristic for a long period of time.

SUMMARY OF THE INVENTION

It is an object of the present invention to provide a hydraulic control apparatus which can impart the oil pressure having a stabilized characteristic relative to the vehicle speed or the steering oil pressure to enhance the handle rigidity when the vehicle travels straight forward at high speed.

It is another object of the present invention to provide a hydraulic control apparatus which, at the time of reducing speed, can gradually release the oil pressure applied to the hydraulic chamber to provide a stabilized steering feeling.

In accordance with the present invention, there is provided an hydraulic control apparatus used for a handle or wheel steering force control device of an automobile comprising a power steering device for assisting a steering force of a steering handle or wheel of an automobile by pressurized fluid from a fluid pump and a hydraulic reaction chamber for applying a force, which is opposed to a steering force of the steering handle by the power steering apparatus, to the steering handle by the fluid, the hydraulic control apparatus comprising a valve case having, in an oil passage from the oil pump to a main valve of the power steering device, an inlet from the oil pump, a return outlet, a reaction oil outlet in communication with the hydraulic reaction chamber and a main valve outlet in communication with the main valve; a main spool slidably inserted into the valve case and always biased in a one direction by a resilient member; and a sub-spool slidably inserted into the main spool and axially slidably moved in response to the vehicle speed, the main spool having a first bore in communication with the inlet, a second bore in communication with the reaction outlet, a third bore in communication with the outlet of the main valve and variable communicating means in selective communication with the reaction outlet, an inner peripheral surface of the main spool and an outer peripheral surface of the sub-spool being formed with oil passages formed so as to vary open surfaces thereof by relative displacement between the inner and outer peripheral surfaces and so as to place the first bore in selective communication with the second bore of the third bore, the first bore being communicated with the third bore when the automobile is stopped or is travelling at low speed whereby the fluid from the fluid pump is supplied to the main valve to feed the fluid in the hydraulic reaction chamber to the return outlet through the variable communicating means, while when the automobile travels at high speed, the first bore is communicated with the second bore to feed the fluid to the hydraulic reaction chamber to increase the reaction pressure of the hydraulic reaction chamber, wherein when the reaction pressure reaches a predetermined value in response to the steering pressure, the main spool is moved against the biasing force of the resilient member by the oil pressure in the oil passage and the fluid of the hydraulic reaction chamber is fed to the return outlet by the variable communicating means.

The hydraulic control apparatus according to the present invention is formed with a variable throttle in which an open area varies with relative displacement between the main spool and the sub-spool, and when the automobile is stopped or travels at low speed, the variable throttle is placed in communication with the main valve and the hydraulic reaction chamber is placed in communication with the return outlet. When the automobile travels at high speed, the sub-spool is moved in a direction so as to close the variable throttle on the side of the main valve and open the variable throttle on the side of the hydraulic reaction chamber to increase the reaction pressure of the hydraulic reaction chamber. When reaction pressure reaches a predetermined value in response to the steering pressure, the main spool is displaced by the oil pressure to cut the reaction pressure. Accordingly, when the automobile travels straight forward at high speed, the rigidity of the handle is increased and no delay in response of steering occurs even at the time of sudden steering, in order to lighten the steering force. Since the interior of the valve case is simple, machining with high accuracy may be accomplished and the quantity of oil as a whole is reduced, a hydraulic control apparatus which is compact and inexpensive can be provided.

Other objects, features and effects of the present invention will be apparent from the ensuring detailed description in conjunction with the embodiments shown in the accompanying drawings.

DESCRIPTION OF THE PREFERRED EMBODIMENTS

Figure 1:
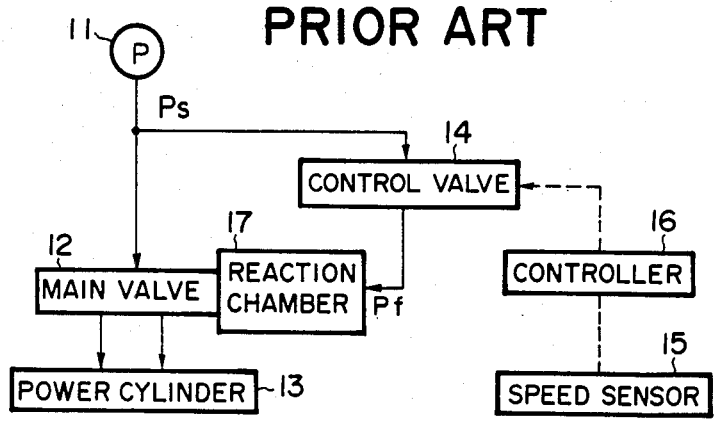
FIG. 1 is a flow chart schematically showing a conventional power steering apparatus.
Figure 3:
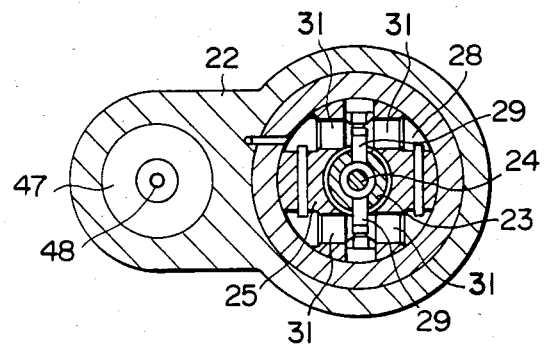
FIG. 3 is a sectional view taken on line 3—3 of FIG. 2.

One embodiment of the present invention will be described hereinafter with reference to FIGS. 2 to 8. First, a power steering device on which the hydraulic control apparatus according to the present invention is mounted will be described in connection with FIG. 2. The power steering device generally indicated as 21 comprises a hollow input shaft 23 rotatably supported on a valve case 22, a torsion bar 24 axially extending through the input shaft 23 and an output shaft 25 connected to the input shaft 23 by the torsion bar 24. The input shaft 23 is connected to a handle or a wheel not shown. A pinion 26 is integrally formed on the lower end of the output shaft 25. A rack 27 connected to a steering shaft (not shown) is meshed with the pinion 26. A hydraulic reaction chamber 28 is provided at the upper part of the output shaft 25. The hydraulic reaction chamber 28 has a piston 31 for pressing two projected members 29 provided on the input shaft 23 from their both surfaces by oil pressure as shown in FIG. 3. A rotary valve or a main valve 32 provided so as to encircle the outer periphery of the input shaft 23 is integrally connected to the output shaft 25 through a drive pin 33. The power steering device as described is well known as seen, for example, in above-mentioned U.S. Pat. No. 4,034,825, and therefore, details of which will be omitted. It is noted that the hydraulic reaction chamber in said U.S. patent is different from that as described above but the operation thereof is totally the same.

A hydraulic control device is indicated generally as 41, which is mounted on a valve case 22 of the power steering device 21. The valve case 22 on the side of the hydraulic control device 41 has a hollow portion 42 both ends of which are open, and a cap 44 having an annular rim 43 is mounted on an upper opening of the hollow portion 42. The annular rim 43 is inserted into the hollow portion 42, and the outer peripheral surface thereof is positioned spaced apart from the inner peripheral surface of the hollow portion 42. The valve case 22 at a portion where the lower end of the annular rim is positioned is formed with an outport 45 in communication with a return oil chamber 34 of the main valve 32 of the power steering device 21 and is formed with a return outlet 46 for connecting the hollow portion 42 with an oil tank (not shown). A solenoid 47 controlled by a vehicle speed sensor 35 is mounted on the lower end of the hollow portion 42 so that a plunger 48 thereof is positioned within the hollow portion 42. A cylindrical sub-spool 49 is mounted on the plunger 48. The sub-spool 49 is formed on its outer periphery surface with an annular oil passage 51 for the hydraulic reaction in a peripheral direction and an annular oil passage 52 for the main valve 32. Two annular oil passages 51 and 52 have an outer peripheral surface 53 provided therebetween and are partitioned by the annular projection 53 which depict a circle in an axial direction. The sub-spool 49 is formed at the end thereof with an end projection 50 the outer peripheral surface of which is flat.

The sub-spool 49 is slidably inserted into a main spool 54. The main spool 54 is hollow-cylindrical, a outer diameter of which has a length enough to come into close contact with the inner peripheral surface of the hollow portion 42. One end of a coil spring 55 bears on the end edge of the main spool 54, and the other end of the spring 55 bears on the rear surface of the cap 44 of the annular rim 43. The main spool 54 having its rear end is always elastically biased against the end edge of the solenoid 47 by the spring 55. The axial length of the main spool 54 is shorter than the distance from the end edge 40 of the annular rim 43 to the end edge 56 of the solenoid 47. The outer peripheral surface of the main spool 54 are provided with three annular oil passages 59, 61 and 62 partitioned by two annular projections 57 and 58. The annular oil passage 59 is provided in the valve case 22 and is in communication with a reaction oil passage 63 leading to the hydraulic reaction chamber 28 and also in communication with the annular oil passage 51 through an oil port 64. The annular oil passage 61 is provided in the valve case 22 and is in communication with an inlet 66 leading to an oil pump 65 and in selective communication with the annular oil passages 51 and 52 through an oil port 67. The annular oil passage 62 is provided in the valve case 22 and is in communication with an outlet 68 leading to the main valve 32 and in communication with the annular oil passage 52 through an oil port 69. Also, the inner peripheral surface of the main spool 54 are provided with three annular oil passages 73, 74 and 75 partitioned by two annular projections 71 and 72 which are opposite to the annular projections 57 and 58. The annular oil passage 73 is in communication with the annular oil passage 51, the annular oil passage 74 is in selective communication with the annular oil passages 51 and 52 and the annular oil passage 75 is in communication with the annular oil passage 52. Accordingly, the annular projection 53 of the sub-spool 49 and the annular projections 71 and 72 of the main spool 54 constitute a variable throttle. A first return hole or a passage 76 in selective communication with the reaction oil passage 63 is provided in the end of the main spool 54 on the side of the coil spring 55 so that the first return hole 76 may extend through the main spool 54. A second return hole or passage 77 in selective communication with the reaction oil passage 63 is provided in the main spool 54 between the first return hole 76 and the annular oil passage 62 so that the second return hole 77 may extend through the main spool 54. The second return hole 77 has a diameter smaller than that of the first return hole 76.

Figure 4:
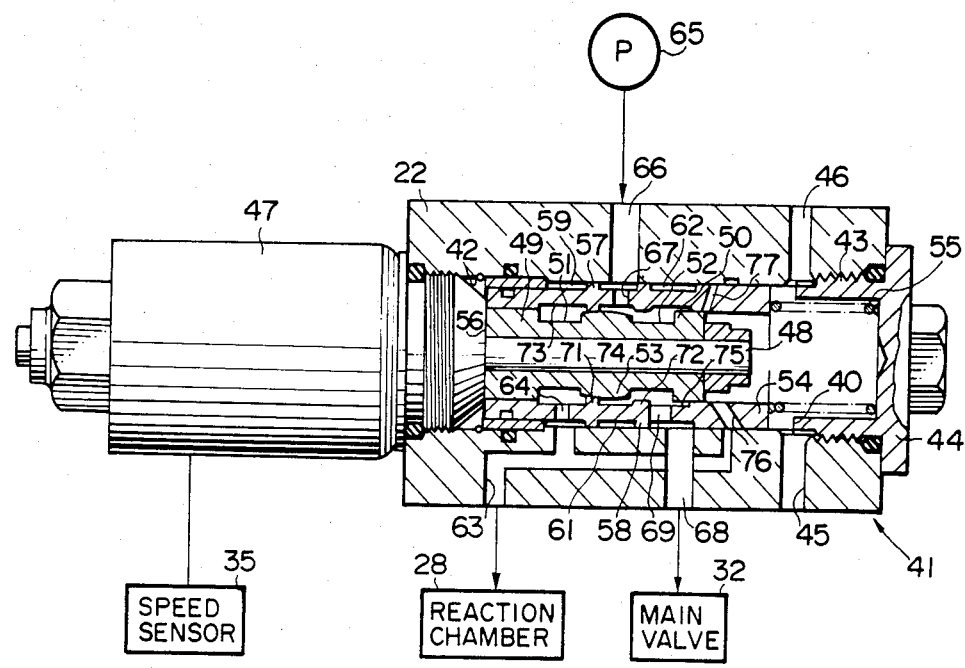
FIG. 4 is a longitudinal sectional view showing the control valve device when the vehicle stops.

Next, operation of the hydraulic control device will be explained. When the vehicle is stopped, the solenoid 47 holds the plunger 48 in a position by a vehicle speed sensor 35, as shown in FIG. 4. The main spool 54 is biased leftward as shown in FIG. 4 by the coil spring 55, and the rear end thereof bears on the end surface 56 of the solenoid 47. At this time, the annular projection 53 of the sub-spool 49 bears on the annular projection 71 of the main spool 54. On the other hand, since the oil port 69 of the main spool 54 is in communication with the outlet 68, oil from the oil pump 65 passes through the oil port 67 from the inlet 66 and is supplied to the annular oil passage 52. The oil supplied to the annular oil passage 52 passes through the outlet 68 from the oil port 69 and is supplied to the main valve 32. When the handle or wheel is steered during stoppage of the vehicle, steering pressure Ps increases but the annular oil passage 51 on the side of the hydraulic reaction chamber is closed by the annular projections 53 and 71, and therefore, oil is not supplied to the hydraulic reaction chamber 28 and reaction pressure Pf in the reaction chamber is not increased. Thus, the characteristic of the steering torque and oil pressure is as shown by the solid line in FIG. 8 to obtain a light steering torque. When a relative displacement occurs between the input shaft 23 and the output shaft 25 by steering, the piston 31 in the hydraulic reaction chamber 28 is pressed by the projected member 29 so that oil in the reaction chamber 28 is returned. Since the first return hole 76 is in communication with the reaction oil passage 63 as shown in FIG. 4, the oil from the hydraulic reaction chamber 28 is returned into the valve case 22 through the first return hole 76 from the reaction oil passage 63 and is returned to the oil tank (not shown) from the outlet 46. Thus, steering torque never increases.

Figure 5:
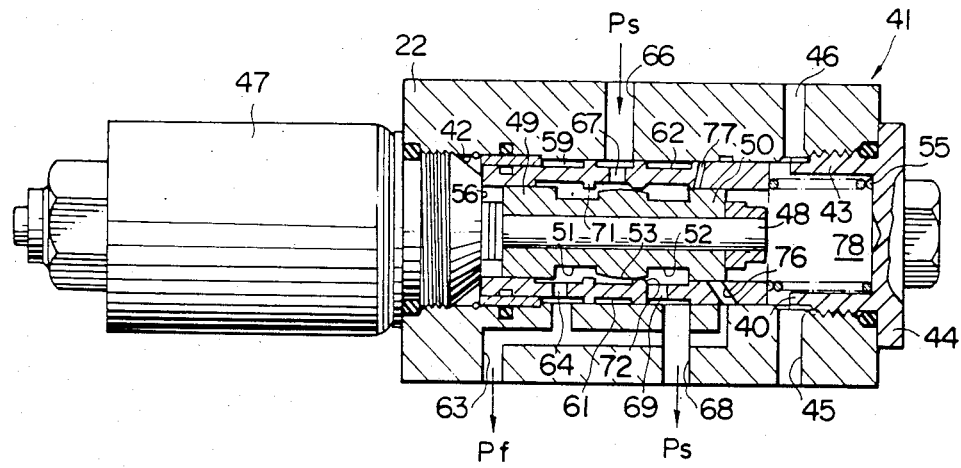
FIG. 5 is a longitudinal sectional view showing the control valve device of FIG. 2 when the vehicle travels straight forward at high speed.

When the vehicle travels straight forward at high speed, the solenoid 47 is actuated by the speed sensor as shown in FIG. 5, and the plunger 48 is moved rightward as viewed in the figure. As a consequence, the annular projection 53 of the sub-spool 49 bears on the annular projection 72 of the main spool 54. Thereby, the oil from the oil pump 65 is supplied to the main valve 32, supplied to the reaction oil passage 63 through the inlet 66, the oil port 67, the annular oil passage 51 and the oil port 64 and supplied to the hydraulic reaction chamber 28. Since the first and second return holes 76 and 77 are closed by the end projection 50 of the sub-spool 49, steering pressure Ps increases by the amount of a in FIG. 8 and reaction pressure Pf likewise increases. Due to the increase in the reaction pressure Pf, the projected member 29 is pressed by the piston 31 and the rigidity in the vicinity of the neutral position of the handle increases.

Figure 8:
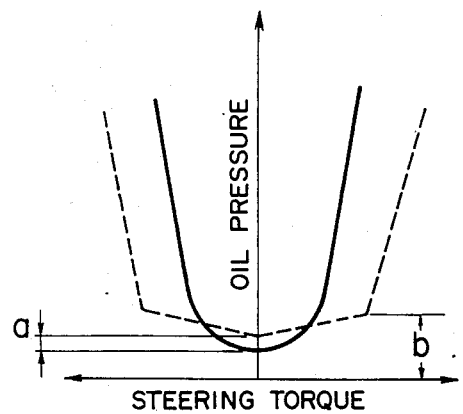
FIG. 8 is a graph showing a torque-pressure characteristic of the power steering device using a hydraulic control apparatus according to the present invention.
Figure 2:
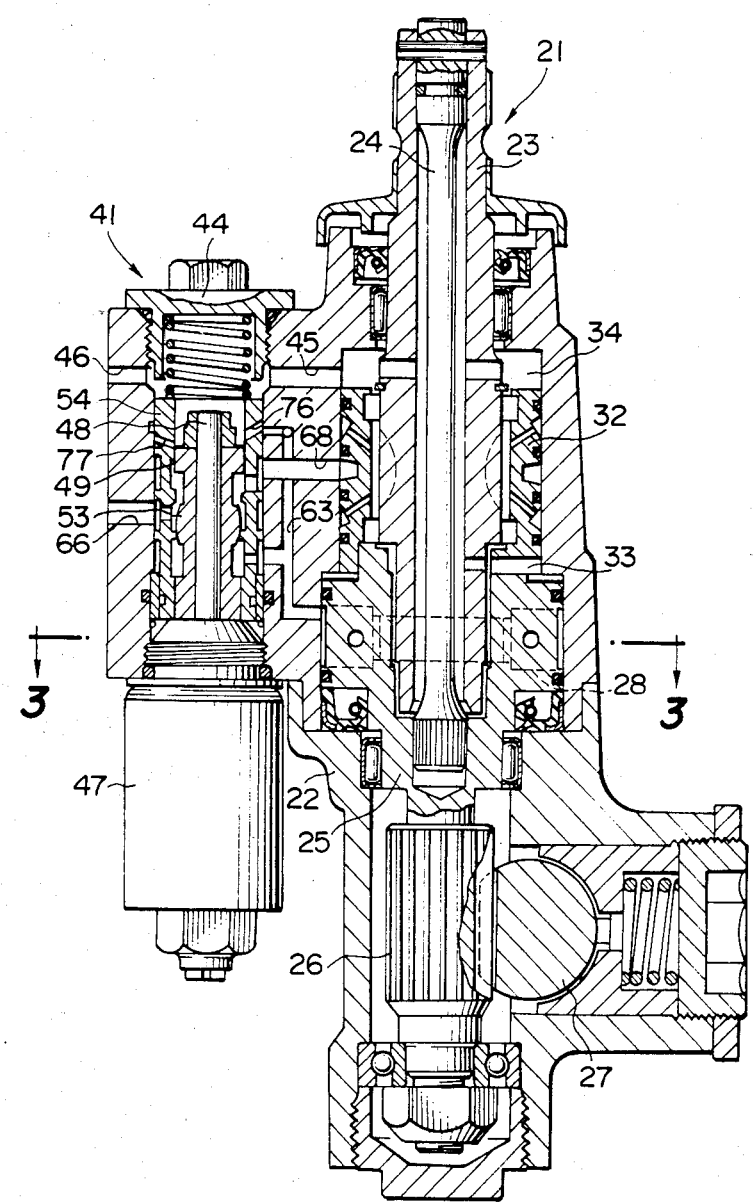
FIG. 2 is a longitudinal sectional view showing the state wherein one embodiment of a control valve device according to the present invention is mounted on the power steering apparatus.
Figure 6:
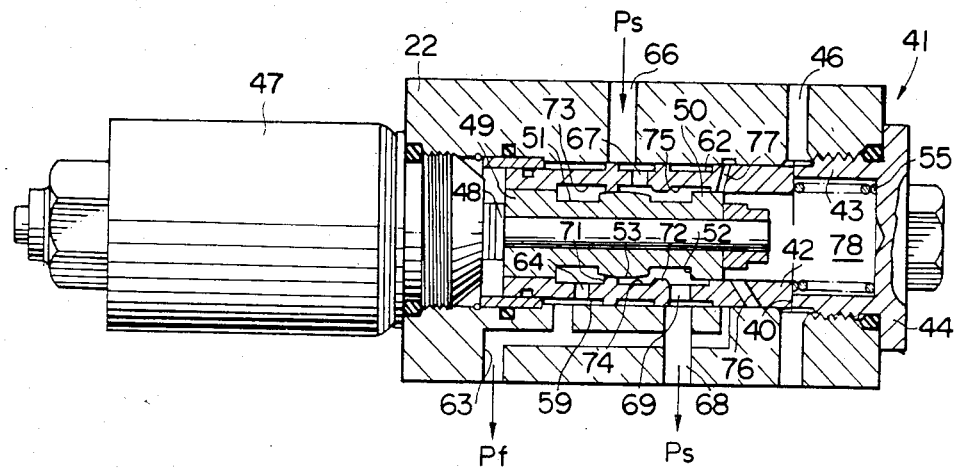
FIG. 6 is a longitudinal sectional view showing the control valve device of FIG. 2 steered when the vehicle travels at high speed.

When steering takes place during running at high speed, the reaction pressure Pf also increases but when the reaction pressure increases up to a point b in FIG. 8, the main spool 54 is moved rightward as shown in FIG. 6 against the elastical force of the spring 55 by oil pressure of the annular oil passage 59, and the end of the main spool 54 bears on the rear end edge 40 of the annular rim 43 of the cap 44. Thereby, the annular oil passage 51 on the side of the hydraulic reaction chamber 28 is closed by the abutment between the annular projections 53 and 71 as shown in FIG. 6 to cut off the reaction pressure. The oil from the oil pump 66 is supplied to the main valve 32 from the outlet 68 through the annular oil passage 52 and oil port 69 from the oil port 67. Return oil from the main valve 32 is fed to the outlet 46 through a clearance between the outer periphery of the annular rim and the inner peripheral surface of the hollow portion 42. Accordingly, it is possible to effect steering with a predetermined weight.

Figure 7:
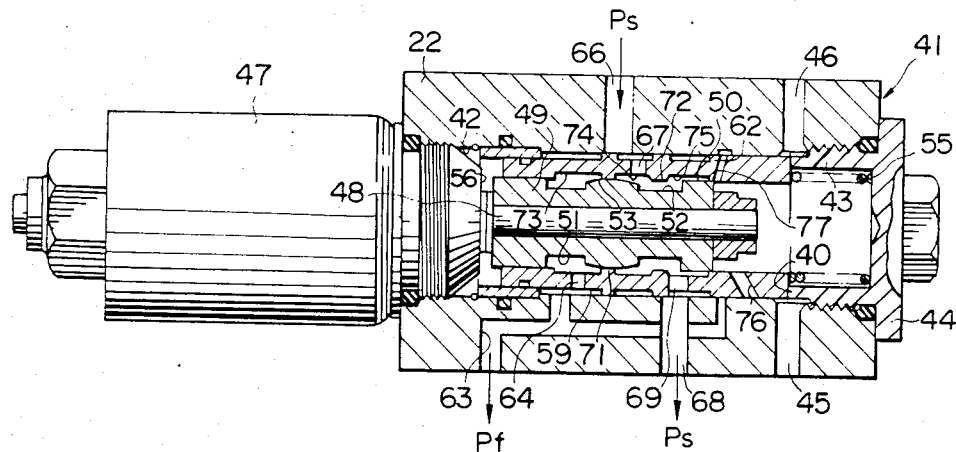
FIG. 7 is a longitudinal sectional view showing the control valve device of FIG. 2 when the vehicle is reduced in speed from the state shown in FIG. 6.

When the vehicle is reduced in speed from the state shown in FIG. 6, the solenoid 47 is operated to move leftward (as shown in FIG. 7) the plunger 48 by the vehicle speed sensor. Thereby, the sub-spool 49 is also moved leftward to make a release abutment between the end projection 50 of the sub-spool 49 and the second return hole 77, and the oil within the hydraulic reaction chamber 28 passes through the second return hole 77 and is returned to the oil chamber 78 formed by the hollow portion 42 and the annular rim 43. Due to the reduction of the reaction pressure Pf, the main spool 54 is also moved leftward by the elastical force of the coil spring 55, and the reaction oil passage 63 is released from communication with the second return hole 77 and is brought into communication with the first return hole 76. Since the first return hole 76 has a diameter larger than that of the second return hole 77, the reaction pressure Pf is promptly reduced. That is, the reaction pressure Pf is not suddenly lowered by the reduction of the vehicle speed. The steering force is also relieved by the lowering of the reaction pressure Pf.

While the present invention has been illustrated in connection with the specific embodiment, it will be noted that various changes in shape and details thereof may be made without departing the gist and scope of the present invention.

What is claimed is:

1. A hydraulic control apparatus for a handle steering force control system of an automobile having a power steering device for assisting a steering force of the steering handle by a pressurized fluid from a fluid pump and a hydraulic reaction chamber for applying a force opposite the steering force of the steering handle to the steering handle by the pressurized fluid, the hydraulic control apparatus comprising:

a valve case having an inlet connected to the fluid pump, a return outlet connected to a fluid tank, a reaction outlet in communication with the hydraulic reaction chamber, a main valve outlet in communication with a main valve of the power steering device, and a resilient member provided at an end portion of the valve case;

a main spool slidably inserted into the valve case and biased in an axial direction of the valve case by the resilient member and having a first bore in communication with the inlet, a second bore in communication with the reaction outlet, a third bore in communication with the main valve outlet, variable communicating means for selectively connecting the reaction outlet and the return outlet, and an inner peripheral valve surface;

a sub-spool slidably inserted into the main spool and axially movable with respect to the main spool in response to a vehicle speed and having an outer peripheral valve surface, oil passages defined by the inner peripheral valve surface and the outer peripheral valve surface, and operative to variably open the oil passages by relative displacement between the inner and outer peripheral surfaces and to place the first bore in selective communication with the second bore or the third bore;

drive means for axially moving the sub-spool with respect to the main spool in response to the vehicle speed and operative when the vehicle speed is below a certain value to enable the oil passages to connect the first bore and the third bore whereby the fluid from the fluid pump is supplied to the main valve and to enable the variable communicating means to connect the reaction outlet and the return outlet whereby the fluid in the hydraulic reaction chamber is fed to the return outlet, and operative when the vehicle speed is above the certain value to enable the oil passages to connect the first bore and the second bore and to enable the variable communicating means to disconnect the reaction outlet and the return outlet whereby the fluid from the fluid pump is supplied to the reaction chamber so as to increase the reaction pressure thereof; and the main spool being responsive to the reaction pressure in the oil passages and movable against the biasing force of the resilient member when the reaction pressure reaches a predetermined value for enabling the variable communicating means to connect the reaction outlet and the return outlet.

2. The hydraulic control apparatus according to claim 1, wherein said variable communicating means comprises a first passage for communicating said reaction outlet with said return outlet through said sub-spool when the reaction pressure reaches a predetermined value and a second passage being closed when said main spool is moved against the biasing force of said resilient member and being in communication with said reaction outlet when the vehicle speed is below the certain value.

3. The hydraulic control apparatus according to claim 2, wherein the first passage comprises a smaller opening and the second passage comprises a larger opening.

4. The hydraulic control apparatus according to claim 1, wherein the drive means comprises solenoid means mounted to the sub-spool and responsive to a vehicle speed sensor.

5. A steering force control apparatus for a power steering apparatus of a vehicle of the type having a reaction chamber responsive to fluid pressure applied thereto for producing a reaction force to counteract the steering force produced by a power cylinder, and a fluid pump and a fluid tank for circulating a fluid through the power steering apparatus, the steering force control apparatus comprising:

a valve case having an inlet connected to the fluid pump for receiving the fluid pressure produced by the fluid pump, a return outlet connected to the fluid tank for releasing the fluid pressure, and a reaction outlet connected to the reaction chamber for applying the fluid pressure thereto;

a main tubular spool disposed in the valve case and movable relative to the valve case and having a first bore in communication with the inlet, a second bore in communication with the reaction outlet and an inner valve surface extending over the first bore and the second bore;

a sub-spool disposed in the main spool and movable relative to the main spool and having an outer valve surface cooperative with the inner valve surface;

throttling means comprised of the inner valve surface and the outer valve surface for selectively connecting the inlet and the reaction outlet according to the movement of the sub-spool relative to the main spool;

variable communicating means provided in the main spool for selectively connecting the reaction outlet and the return outlet according to the movement of the main spool relative to the valve case and the sub-spool;

first driving means for moving the sub-spool relative to the main spool in response to a vehicle speed and operative when the vehicle speed is above a certain value to enable the throttling means to connect the inlet and the reaction outlet, and to enable the variable communicating means to disconnect the reaction outlet and the return outlet whereby the fluid pressure is applied to the reaction chamber; and second driving means for moving the main spool relative to the valve case and the sub-spool in response to the fluid pressure applied to the reaction chamber and operative when the fluid pressure is above a certain value to enable the throttling means to disconnect the inlet and the reaction outlet, and to enable the variable communicating means to connect the reaction outlet and the return outlet whereby the fluid pressure is released to the fluid tank.

6. A steering force control apparatus according to claim 5; wherein the valve case further comprises a main outlet connected to the power cylinder, the main tubular spool further comprises a third bore on the inner valve surface in communication with the main outlet, and the throttling means includes means operative to connect the inlet and the main outlet whereby the fluid pressure is applied to the power cylinder through the steering force control apparatus.

7. A steering force control apparatus according to claim 6; wherein the first driving means includes means operative when the vehicle speed is below the certain value to enable the throttling means to connect the inlet and the main outlet and to disconnect the inlet and the reaction outlet, and to enable the variable communicating means to connect the reaction outlet and the return outlet whereby the fluid pressure applied to the reaction chamber through the power steering apparatus is released to the return outlet.

8. A steering force control apparatus according to claim 7; wherein the variable communicating means comprises a first passage for connecting the reaction outlet and the return outlet when the fluid pressure is above the certain value, and a second passage for connecting the reaction outlet and the return outlet when the vehicle speed is below the certain value.

9. A steering force control apparatus according to claim 8; wherein the first passage has a smaller opening and the second passage has a larger opening.

10. A steering force control apparatus according to claim 5; wherein the first driving means commprises a solenoid connected to the sub-spool and operative in response to the vehicle speed.

11. A steering force control apparatus according to claim 5; wherein the second driving means comprises a resilient member provided in the valve case in contact with the main spool for biasing the main spool in a rest position when the fluid pressure is below the certain value.

12. A steering force control apparatus according to claim 11; wherein the second driving means further comprises means defining a variable space provided in the main spool for moving the main spool against the biasing force in response to the fluid pressure transmitted to the variable space by enlarging the variable space.

* * * * *